United States Patent
Sosonkin et al.

(10) Patent No.: US 10,606,825 B1
(45) Date of Patent: Mar. 31, 2020

(54) FLEXIBLE INSTALLATION OF DATA TYPE VALIDATION INSTRUCTIONS FOR SECURITY DATA FOR ANALYTICS APPLICATIONS

(71) Applicant: Synack, Inc., Redwood City, CA (US)

(72) Inventors: Mikhail Sosonkin, Redwood City, CA (US); Kirti Chawla, Redwood City, CA (US); Mark Kuhr, Los Altos, CA (US)

(73) Assignee: SYNACK, INC., Redwood City, CA (US)

( * ) Notice: Subject to any disclaimer, the term of this patent is extended or adjusted under 35 U.S.C. 154(b) by 398 days.

(21) Appl. No.: 15/445,745

(22) Filed: Feb. 28, 2017

(51) Int. Cl.
| | |
|---|---|
| *G06F 17/30* | (2006.01) |
| *G06F 16/23* | (2019.01) |
| *G06F 21/62* | (2013.01) |
| *G06F 16/248* | (2019.01) |
| *G06F 16/9535* | (2019.01) |

(52) U.S. Cl.
CPC ........ *G06F 16/2365* (2019.01); *G06F 16/248* (2019.01); *G06F 16/9535* (2019.01); *G06F 21/6227* (2013.01)

(58) Field of Classification Search
CPC ............. G06F 16/2365; G06F 16/9535; G06F 16/248; G06F 21/6227
See application file for complete search history.

(56) References Cited

U.S. PATENT DOCUMENTS

| | | | |
|---|---|---|---|
| 8,849,716 B1* | 9/2014 | Everhart | G06F 21/6245 705/51 |
| 9,218,252 B1* | 12/2015 | Revur | G06F 16/2365 |
| 2012/0089481 A1* | 4/2012 | Iozzia | G06F 21/31 705/26.41 |
| 2014/0279947 A1* | 9/2014 | Chachra | G06F 16/215 707/691 |
| 2016/0321277 A1* | 11/2016 | Costabello | G06F 16/2365 |

(Continued)

*Primary Examiner* — Huawen A Peng
(74) *Attorney, Agent, or Firm* — Hickman Palermo Becker Bingham LLP (57) ABSTRACT

A method and apparatus for extracting and displaying a feature data set is provided. A method comprises: retrieving a digitally stored first data set from a first digital data storage source; selecting a first data set type of a plurality of data set types for the first data set based at least in part on the first source, and creating and storing an association of the first data set type to the first data set; selecting a first validation process from among a plurality of validation processes based at least in part on the first data set type; executing program instructions corresponding to the first validation process using at least a portion of the first data set to determine if the first data set is valid; in response to determining that the first data set is valid, assigning a validator instruction set to the first data set; assigning at least a portion of the first data set to a first analytics instruction set of a plurality of analytics instruction sets based on the first type and the validator instruction set; causing execution of the first analytics instruction set using at least a portion of the first data set to extract and store a feature data set representing features of the first data set; in response to a query, causing a feature represented in the feature data set to be displayed on a computer display device using a graphical user interface.

10 Claims, 7 Drawing Sheets

(56) References Cited

U.S. PATENT DOCUMENTS

| | | | |
|---|---|---|---|
| 2016/0328610 A1* | 11/2016 | Thompson | G06K 9/00469 |
| 2017/0132300 A1* | 5/2017 | Sekar | G06Q 10/067 |
| 2018/0089249 A1* | 3/2018 | Collins | G06F 16/282 |
| 2018/0165325 A1* | 6/2018 | Barrat | G06F 11/3624 |
| 2018/0232204 A1* | 8/2018 | Ghatage | G06F 7/02 |

* cited by examiner

FLEXIBLE INSTALLATION OF DATA TYPE VALIDATION INSTRUCTIONS FOR SECURITY DATA FOR ANALYTICS APPLICATIONS

FIELD OF THE DISCLOSURE

The technical field of the present disclosure generally relates to computer programs configured for collating data from a variety of sources for use in computer security systems and computer security analysis. Portions of the disclosure are in the technical field of computer systems that have a scalable architecture that enable general purpose correlations over disparate and arbitrarily structured data sets.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computers operating in the security industry often require processing large data sets from a variety of sources. These sets can include machine scanning results, network traffic surveillance data, logs from intrusion detection systems, or machine generated test cases. Computer systems can offer value from the ability to work on these data sets without any arbitrary constraints and to apply correlations to previously undiscovered patterns based on emerging requirements. However, as an industry grows, so does the diversity and size of the data sets, and this growth causes scaling problems for single-host or unstructured multi-host solutions. A particular problem is how to integrate a completely new kind of data set into a security system or security analytics system that was not originally programmed to process that kind of data set.

Distributed computation is often employed as a means of managing large data sets. However, as the complexity of the computation grows, the systems must become more specialized in the domain of their application. This is a direct consequence of tradeoffs made in order to arrive at a usable state. Therefore, moving generic frameworks and systems for distributed computation towards customized end-user applications is desirable.

Map-reduce (MR) is a well-known and industry standard distributed computing paradigm. The nature of the MR model enables general purpose computations over distributed computing nodes. MR is a two-stage distributed computing model, wherein in the first stage (also known as the "map" stage), a transformation is applied to each item of the input data set. Subsequently, in the second stage (also known as the "reduce" stage), the output of the previous stage is reduced to a smaller set. The second stage can be applied iteratively until a desired result is reached. This model naturally manifests in distributed systems because the first stage captures the need for applications to be independent of each other and the second stage can be distributed based on data-derived keys. Open source data-driven scripting languages such as Apache PIG utilize the MR model to provide the user with the ability to perform general purpose computation on data sets over a set of distributed nodes.

The logical components that process the data using the MR model are called "analytics." Each analytic consumes an input data set to produce an output data set. Thus, while MR provides significant operational guidance in principle, a substantial intermediate processing is required to setup data delivery pipelines, ensuring data consistency, and storing and curating intermediate and final result data sets. Moreover, because data is typically received from a variety of sources and different sources may have different structuring, it can be difficult to effectively correlate the data.

Thus, effective security analysis requires collating data from a variety of sources. A single database is not necessarily sufficient to structure the data from disparate but relatable sources. One of the causes for such an occurrence is that most databases are ill-suited to address the unforeseen scenario of structuring data from different sources that must be correlated based on emerging requirements. Therefore, a new form of data management environment is needed that enables arbitrary structuring of data.

Furthermore, due to the MR computing model's prominence, flexibility, usability, and applicability, several commercial off-the-shelf implementations are available such as Amazon Elastic Map Reduce or EMR or Google Cloud Services. EMR and other similar implementations give end-users the ability to purchase compute time in managed offsite data-centers. However, the end-user must be creative to carefully apply these offerings to solve their specific problems.

SUMMARY OF THE INVENTION

The appended claims may serve as a summary of the invention.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Embodiments are described in sections according to the following outline:

1. GENERAL OVERVIEW
2. COMPUTER SYSTEM OVERVIEW
3. EXAMPLE ALGORITHM FOR EXTRACTING AND DISPLAYING A FEATURE DATA SET

4. IMPLEMENTATION EXAMPLE—HARDWARE OVERVIEW

1. General Overview

In an embodiment, a data processing method comprises retrieving a digitally stored first data set from a first digital data storage source; selecting a first data set type of a plurality of data set types for the first data set based at least in part on the first source, and creating and storing an association of the first data set type to the first data set; selecting a first validation process from among a plurality of validation processes based at least in part on the first data set type; executing program instructions corresponding to the first validation process using at least a portion of the first data set to determine if the first data set is valid; in response to determining that the first data set is valid, assigning a validator instruction set to the first data set; assigning at least a portion of the first data set to a first analytics instruction set of a plurality of analytics instruction sets based on the first type and the validator instruction set; causing execution of the first analytics instruction set using at least a portion of the first data set to extract and store a feature data set representing features of the first data set; in response to a query, causing a feature represented in the feature data set to be displayed on a computer display device using a graphical user interface. Other features and aspects of embodiments of such a method will become apparent from the disclosure as a whole.

Embodiments provide systems and methods for collating data from a variety of sources wherein multi-user, separate, and simultaneous instances of analytics can be processed. A data fusion environment enables arbitrary structuring of data by providing a scalable architecture and system that enables general purpose and massive data-based correlations over disparate and arbitrarily structured data sets. This arbitrary structuring of data is performed without requiring expectations or assumptions about the structure of the underlying inputs of the to-be-processed data. Inputs may come from a potentially large number of different sources that may be varied, numerous, and extensible. Example sources of data that can be used with embodiments programmed for computer security analysis include network taps, automated scanning systems, machine scanning results, network traffic surveillance data, logs from intrusion detection systems, or machine generated test cases. A data fusion environment as disclosed herein provides mechanisms for extracting data as well as contextual metadata information from such sources.

The systems described herein support Turing complete analytics. End-users are provided mechanisms to represent any computational logic through applying an analytic to the inputs. The analytics are capable of executing over a significantly large data set. Special processing systems transcend the memory constraints present in the conventional general purpose computational model.

Because data may be collected from several disparate and uncoordinated sources, the described systems do not impose structure or formatting requirements on input data. However, after the input data has been ingested, the data is transformed and pertinent formatting and structuring requirement are applied to the data.

The definition and scope of analytics is general, which allows the system to be extensible, as more use-cases are discovered with user feedback. End-users are able to expressly state the logic towards an analytic which is suitable towards a given task.

In one embodiment, a data processing system implements the following general operations to collate input, perform a variety of processing, and store data at pertinent locations: a file system ingests data from different sources into the central store in a frequent and periodic manner; during ingestion, the records are convened to flat items as further defined herein, wherein feature extraction analytics execute as multi-records is not established at this point; once the ingestion is complete, production analytics are triggered in a timely fashion through a job scheduler; while appending to their own tables in the central store, each analytic will specify the data sources they want to use as inputs and be uniquely defined through their output tables having relevant FeatureItems; an API query interface will allow the end-users to explore the outputs of each analytic by providing a facility to browse feature items.

Other aspects and features of various embodiments will become apparent from other sections of the description.

2. Computer System Overview

Figure 1:
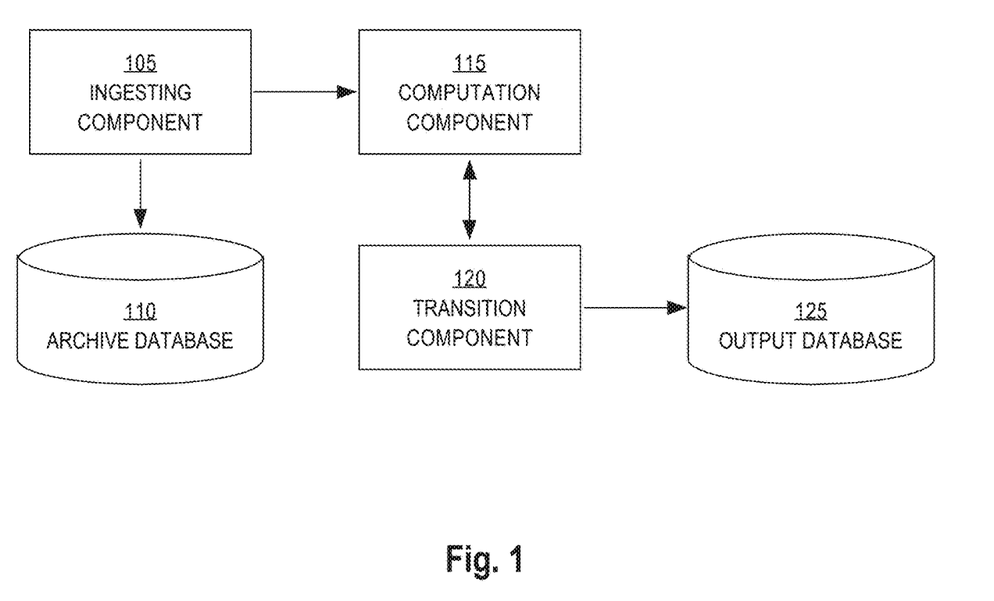
FIG. 1 illustrates a networked computer system in which one or more embodiments may be implemented.

FIG. 1 illustrates a networked computer system in which one or more embodiments may be implemented.

In the example of FIG. 1, a networked environment 100 comprises one or more computing devices programmed as special purpose machines that communicate via one or more electronic networks such as any of local area networks (LANs), Wide Area Networks (WANs), and/or internetworks such the public Internet. The environment 100 may include computing devices that are operated, hosted by or associated with various different entities or persons, such as an online security provider, a security researcher, and a web application provider. The environment 100 includes services and databases that are programmed for ingesting, storing, and/or computation of data inputs.

In an embodiment, ingesting component 105 comprises a computing device that is programmed or configured to receive data from external sources; the ingesting component may comprise a set of programmed instructions in memory. The ingesting component 105 is further configured to apply transformations to the received data, and may apply multiple transformations to a single data set. A data set may include, for example, anti-malware code to be installed in a security analytics system. Each transformation may extract certain information (i.e., features) from the data set. For example, Table 1, below, provides list of features that may be extracted from a data set.

TABLE 1

Example transformation of a data set

| Column | Value |
|---|---|
| Format | The format of the data field which is synonymous with the data source name. Example: HTTPRecord_v1, TCPRecord_v2 |
| Data | Raw record which is in the format specified by the source system. |
| UUID | A name ID to uniquely identify a record. |
| From | Source of the data (e.g. an IP address). |
| To | Destination of the data (e.g. IP address). |
| Time | Context-sensitive at-source timestamp for the record. |
| Listing | Listing associated with the record. |
| Org | Organization associated with the record. |
| Sec | Pertinent security label for access-control. |

In an embodiment, the ingesting component 105 may utilize Apache NIFI as a flow manager that receives input data, performs basic transformations, and stores the output data in HDFS and S3. The ingesting component, acting as flow manager, may be coupled to a Hadoop-based cluster with HDFS that enables extensive data fusion and comprehensive analytics programming. A summary database may be coupled to the flow manager and cluster in the form of a Postgres-based database instance in which the analytic output is stored. An API layer may expose summaries from the select database instances to different HTTP protocol-based clients. To illustrate a clear example, FIG. 3B illustrates an example entry point of a TCP dataset and data flows to cause storing the dataset in HDFS.

Data is managed by the flow system. Before any dataset is fused with HDFS in the above example, it is wrapped into a FlatItem and labeled with type information. Code Sample 1, below, provides example code for generating a FlatItem, showing the manner in which an input record is processed and the corresponding FlatItem is generated.

---
Code Sample 1: Generating a FlatItem
---
```
def lp_obj = jsonSlurper.parseText(text)
def s_org_id = lp_obj.metadata.org_id
def s_listing_id = lp_obj.metadata.listing_id
def s_format = 'lp_tcp'
def s_time = df.format(new Date( ))
def s_from = lp_obj.ip.srcIp
def s_to = lp_obj.ip.dstIp
def s_uuid = UUID.randomUUID( );
def json = new JsonBuilder( )
def root = json uuid: s_uuid, format: s_format, data: text,
    from: s_from, to: s_to, time: s_time,
    listing: s_listing_id, org: s_org_id
```
---

For example, for a TCP flow, the type may be set to lp_tcp. It is possible to set the type information because the context of the data source is still available. While Code Sample 1 is for FlatItem records, other data types may use a similar process. Further, since the context is implied, the type information is embedded as metadata for any analytic that later reads the records.

As shown in Table 1 and Code Sample 1 for an example, ingesting component 105 may be programmed to extract a variety of features from a data set, including format (which may include a name or identifier of the source of the data) and a "from" value (which may include an IP address of the source). The information listed in Table 1 may be referred to herein as a "FlatItem." Ingesting component 105 may be programmed to apply a further transformation to the FlatItem (or individual features of the FlatItem) to extract additional information, referred to herein as a "FeatureRecord." As shown in Table 1, a FlatItem may have a "UUID" which identifies a FeatureRecord associated with the FlatItem. An example FeatureRecord is illustrated below in Table 2.

TABLE 2

Example transformation of a FlatItem

| Column | Value |
|---|---|
| Key | Name of the entry. |
| Value | Raw value of the entry. |
| Type | Type name of the Value entry. Example: Integer, URL, Average. |
| UUID | A name ID to uniquely identify a FeatureItem. |
| Time | Context-sensitive at-source timestamp for the entry. |
| Listing | Listing associated with the entry. |
| Org | Organization associated with the entry. |
| Sec | Pertinent security label for access-control. |

The FeatureRecord in Table 2 includes features derived from a variety of sources, including FlatItems. As shown in Table 2, a FeatureRecord contains a name and raw value of an "entry." An entry may contain a variety of information, for example URL paths, host names, numerical calculations, etc. One or more features of a FeatureRecord may update over time. When a FeatureRecord is updated, a new FeatureRecord may be created which includes updated data. The new FeatureRecord may have the same UUID as the previous FeatureRecord to create an association between the two records. For example, a mean calculation represented by a FeatureRecord may be updated and the new value may be included in a new FeatureRecord.

Information contained in one or more FeatureRecords may be combined to form a "FeatureItem." As shown in Table 2, a FeatureRecord includes a UUID to uniquely identify a FeatureItem associated with the FeatureRecord. Multiple FeatureRecords may have a common UUID because multiple FeatureRecords can be associated with the same FeatureItem. FeatureRecords having a common UUID may be stored adjacently or otherwise to form a FeatureItem.

By generating both FlatItems and FeatureItems, the environment 100 is programmed to allow for data exploration in directions which may be purposefully loosely defined and whose requirements may evolve with time. Having separate feature sets enables programs or systems to use different data exploration strategies based on a variety of inputs to the system while handling unprecedented structuring of inputs and outputs.

As shown in Table 2, a FeatureRecord also includes a "type" of the entry. Example types may include integer, URL, average, HTTP record, HTTP method, TCP records, time of flow start, customer association, and path depth. Associating a type with each record provides structural consistency for records even from different sources and thereby improves processing accuracy and efficiency. External programs or systems can use, construct and/or update types as needed to more accurately define entries. Types may be updated to create a more precise definition or to convert to another format. For example, data may be converted from decimal to scientific notation. Types can be used to structure data in the ingesting component 105, computation component 115, or elsewhere in the environment 100.

Some types are associated with a validation function. Such types are referred to herein as "raw types." Code Sample 2, below, provides example code for defining a raw type. A validation function is applied to an entry having a particular type associated with the validation function in order to determine if the entry is valid. A program or system can specify the interpretation process for a particular validation function. For example, a Python Ripper/Encoder (PyRE) value would use a Python regular expression while a JavaScript Object Notation (JSON) value would use a JSON compliant schema.

---
Code Sample 2: Type Definition for Raw Types
---
```
// Raw types:
// type [type name] [validation function] [regex validator]
typedef Integer PyRE -?[0-9]+
typedef PositiveInteger PyRE [0-9]+
// Contextual Aliasing:
// typedef[ type name] [(list) aliased to]
alias HttpHeaderCount Integer, PositiveInteger
```
---

As shown in Code Sample 2, some embodiments may involve "aliasing" types. An aliasing type contains a list of raw types, each of which must be validated in order to validate a data item associated with the aliasing type. In Code Sample 2, an integer is defined which is subsequently used to represent HTTP header counts. This type of aliasing enables an analytic to vary a search query to be specific or general as needed. Alias definitions may be limited to raw types only to preclude circular self-referential definitions. Code Sample 3, below, lists functions that can be implemented.

---
Code Sample 3: Implementable Functions for Type Safety
---
```
// _value_ is any string to be validated e.g. value from feature
item
// _typeinfo_ is the validation function coupled with regex,
schema, etc. bool validate(String value, Validator typeinfo)
// Determines if one is an alias for another
bool isAlias(String typeName, String typeName)
// finds the first raw type that allows the given value
Validator findType(String value)
// Gets the list of all type aliases for the raw type name
String[ ] getAlias(String typeName)
// Converts the data type i.e. 3E3 to 300
String cast(Validator fromType, Validator toType)
```
---

Raw and aliasing types also provide additional search capabilities for other systems or programs. For example, a search for a particular value can filter results by type and/or alias associated with the value. In Code Sample 2, using the precise raw type would yield integers only, while using a list of aliases type would yield HttpHeaderCounts in addition to integers.

Following the transformations performed by ingesting component 105, the data (including FlatItems and FeatureRecords) may be stored in the archive database 110.

The ingesting component 105 may also send the data to the computation component 115. The computation component 115 is programmed to apply analytics-based transformations on inputted data using the MR computation model. The analytics-based transformations may be both scheduled and demand-oriented. While scheduled analytics require little to no attention post setup and help sustain analytics-based transformations, the demand-oriented analytics help discover newer insights from collated data along the pre- or post-processing stages. The computation component 115 may be any device and/or software (e.g., an end-user application) capable of executing logic to further extract information through correlations based on inputted data. Code Sample 4, below, is example code for a computation that reads data as strings and requests a library to provide a per-line parsing function.

---
Code Sample 4: Processing String Data
---
```
flats = LOAD '/user/hadoop/flats1'
USING PigStorage( ) AS flat:chararray;
flats = FOREACH flats GENERATE flatItem.readFlat(flat) AS flat;
attacks = FOREACH flats GENERATE attack.attackLabel(flat);
attacks = FILTER attacks BY COUNT(features) > 0;
attacks = FOREACH attacks GENERATE
featureItem.pigFeaturesToJson(features);
```
---

As shown in Code Sample 4, the computation component 115 can execute different functions, such as content classification, to generate FeatureItems. Code Sample 5, below, generates a type-checked FeatureItem.

---
Code Sample 5: Generating Type-Checked FeatureItem
---
```
def derive_kv(_type, key, val, source_flat):
    return {
```

---
Code Sample 5: Generating Type-Checked FeatureItem
---
```
        'uuid': source_flat['uuid'],
        'key': key,
        'value': val,
        'type': _type,
        'time': source_flat['time'],
    }
def labelsToFeature(flat_rec, labels):
    return [derive_kv('label', 'attack', label, flat_rec)
        for label in labels]
```
---

Code Sample 5 can be utilized to apply validation routines to ensure that data conforms to its labeled type. While it may be possible that the values diverge from the specified type due to systemic error, data corruption, or other errors, through type checking it may be feasible to ensure that the impact of such errors is limited.

Output from the computation component 115 is sent to the transition component 120, where it may be determined whether the data is sent to an output database 125 or is returned to the computation component 115 for further execution with an added advantage of minimally utilizing compute cluster resources. For example, utilizing the transition component 120 frees up the computation component 115 to perform other, in some cases more intensive, tasks. Data that has been sent to the output database 125 is available for accessing by users through queries or other methods. For example, Structured Query Language (SQL) may be used to query the output database 125, which could be implemented using a plurality of Postgres database instances that store FeatureItem analytic output data. This approach permits providing a system that safely exposes collected data to the end user.

In one embodiment, for a user to request access to and query the data stored in the output database 125, multiple services may be used. Examples include HTTP REST API services. In such an embodiment, each service queries a particular set of stored data. For example, if an output database 125 stores FeatureItems A, B, C, and D, a first service may query systems that hold data for A, B, and C while a second service may query systems that hold data for C and D. In another embodiment, each set of FeatureItems may be packaged into a fully managed service.

Each service has a published request and response guide. Services may be implemented as instructions, methods or objects that respond to application programming interface (API) calls. For example, a published guide may include the parameters that can be sent into the API service as well as the outputted structure. A JSON structure may be used, for example. Each parameter changes the query and, depending on the service, the returned format as well.

Figure 2A:
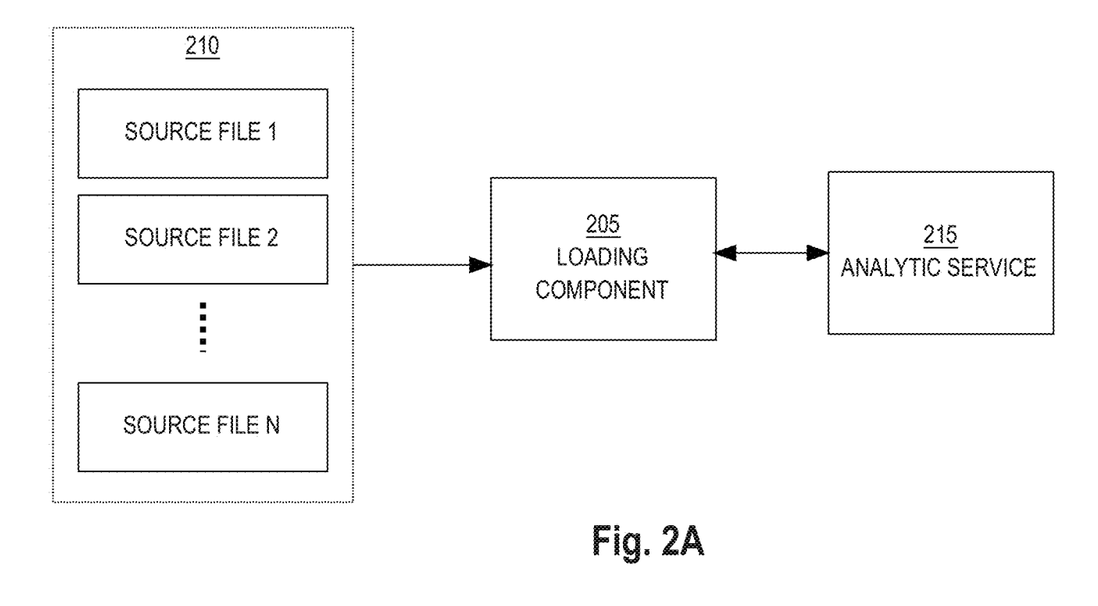
FIG. 2A illustrates a computer system for performing analytics-based transformations of data, according to one embodiment.

FIG. 2A illustrates an example computer system for performing analytics-based transformations of data. Components of FIG. 2A may, for example, be incorporated into the computation component 115 and/or ingesting component 105 of FIG. 1. In an embodiment, FIG. 2 may be programmed to implement an abstraction and loading layer that facilitates validating and loading FeatureItems from different stored files. In an embodiment, the abstraction and loading layer is programmed to: Support arbitrarily structured data and files; Load arbitrarily formatted data from files; Validate, track, and purge records based on their values; Format data fields based on arbitrarily defined logic; Structure the arbitrary data based on well-defined rules (e.g.

FeatureItems); Filter records through arbitrarily defined rules (e.g. date); Load partially processed datasets (e.g. unprocessed not analyzed data files); Support arbitrary validation rules tied to varying field types.

In FIG. 2A, an analytic service 215 is programmed to provide a data source identifier and query parameters to a loading component 205. In response, the loading component 205 is programmed to receive data records from one or more source files 210. The source files 210 may include, for example, FlatItems, FeatureRecords, and other data. The loading component 205 receives data records of these types and stores underlying data structures for all data sources present in the source files 210. Validated and filtered features, which may retain the formatting and structure of the source data records, are provided to an analytic service 215. In this way, when the information is sent to the analytic service 215, the analytic service acquires pertinent fields given particular requested data sources. The analytic service 215 may be programmed to perform a variety of functions, including marking sources of data as logical entities and identifying groups of files.

Using the stored data structures, the loading component 205 is programmed to format and validate the loaded data. The loading component 205 also provides constraint-driven filtering based on queries. For example, the loading component 205 can filter data based on date, data source-specific attributes, etc. The loading component 205 validates, tracks, and purges records based on their values and is therefore capable of supporting arbitrarily structured data and files and loading arbitrarily formatted data from files. The loading component 205 performs operations in a distributed manner using the MR computation model.

Figure 2B:
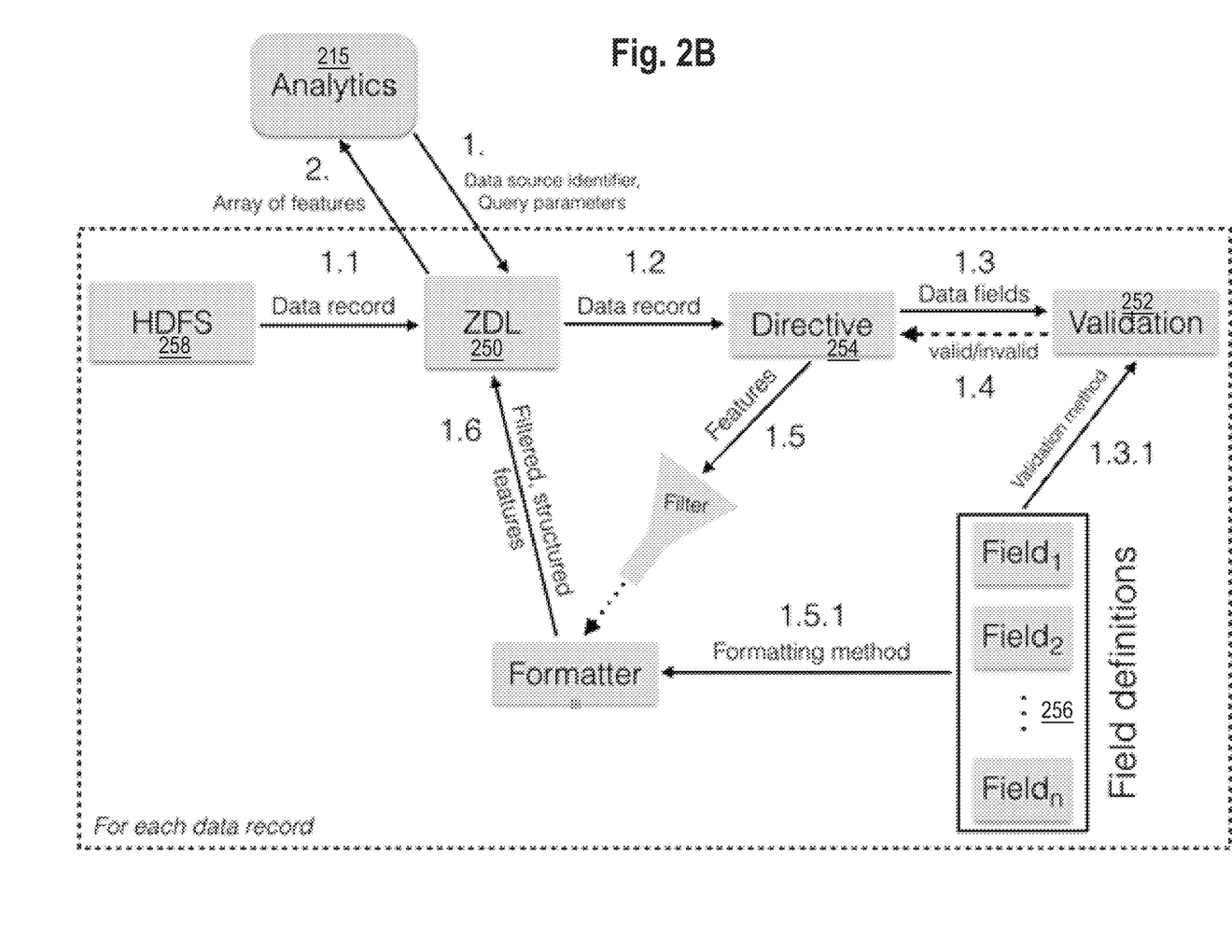
FIG. 2B illustrates example data flows in operation of the loading component 205 of FIG. 2A.

FIG. 2B illustrates data flows in operation of the loading component 205 of FIG. 2A in one specific implementation. In an embodiment, loading component 205 comprises a ZeroDawnLoader (or ZDL) component 250, Validation component 252, and a selection of directives 254 and field definitions 256. The ZDL component 250 maintains a connection with the MR environment such as HDFS 258, receives raw records, sends them to a specific directive corresponding to the data source given by the analytic service 215. The directive 254 then validates, and formats the data according to the field definitions and filters it according to the query parameters as given by the analytic service 215. Having a definition for each field of each data source helps to keep the validation and formatting logic distributed, while the end-user or application program only has to know the fields' names.

Figure 3A:
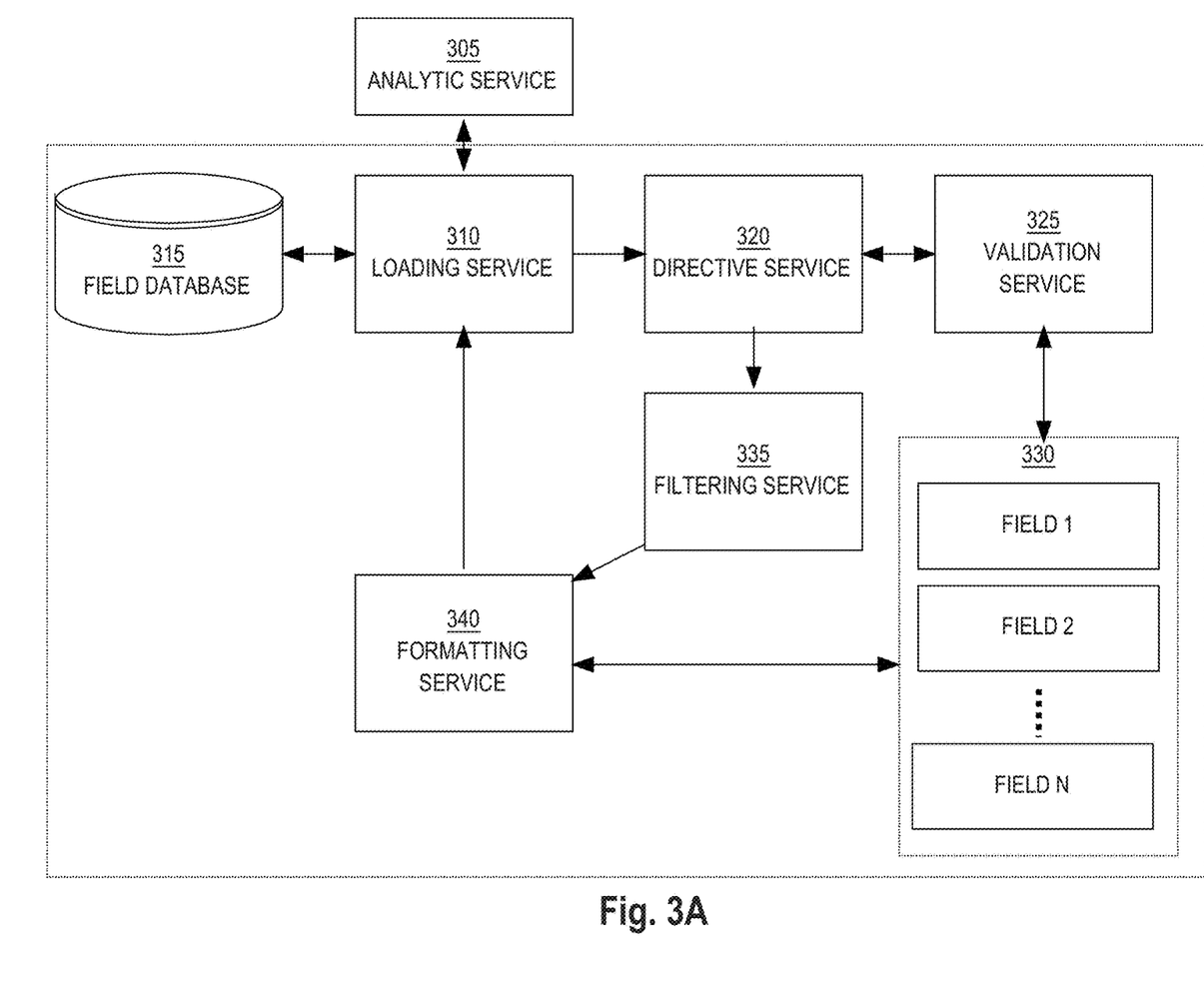
FIG. 3A illustrates a computer system that is programmed for interaction between an analytic service and a loading component, according to one embodiment.
Figure 3B:
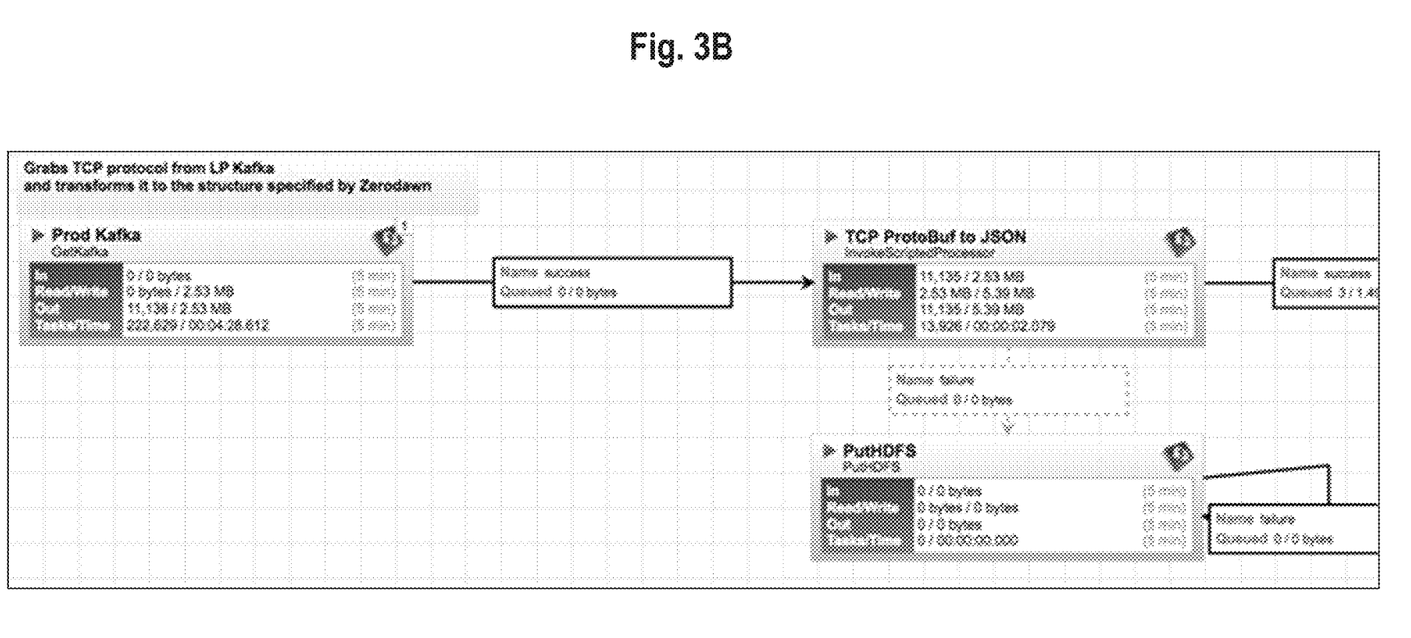
FIG. 3B illustrates an example entry point of a TCP dataset and data flows to cause storing the dataset in HDFS.

FIG. 3A illustrates an example system involving interaction between an analytic service and a loading component.

In an embodiment, a loading component 310 includes multiple services which interact and communicate with each other. An analytic service 305 may communicate directly with a loading service 315 that is contained in the loading component 310. The analytic service 305 may send a query including a data source identifier to the loading service 315. The query may also include one or more parameters based on a user or software request.

The loading service 310 is programmed to retrieve data from the field database 315. Data stored in the field database 315 may include FlatItems and FeatureRecords. The loading service 310 sends the retrieved data to a directive service 320. System 300 may include multiple directive services 320. For example, each data source may have an associated directive service 320. Using the data source identifier provided by the analytic service 305, the loading service 310 sends the data to the corresponding directive service 320.

The selected directive service 320 then accesses a validation service 325 to validate the data. The particular validation service 325 may be selected based on the source of the data. For example, each directive service 320 may have an associated validation service 325. The validation service 325 accesses a field definition 330 of a set of field definitions 330. Each field definition 330 may specify a particular validation method to be used for the data. The particular field definition 330 and/or validation method may be selected based on one or more of the data source provided by the analytic service 305, the particular directive service 320 accessing the validation service 325, or the particular validation service 325.

The validation service 325 returns to the directive service 320 a determination of whether the data is valid based on application of the selected validation method. If the data is valid, the directive service 320 then the data is filtered via a filtering service 335 based on the query parameters from the analytic service 305.

The filtered data is then passed to the formatting service 340. The formatting service 340 retrieves a particular formatting method from a field definition 330. The particular formatting method may be selected based on one or more of the data source provided by the analytic service 305, the particular directive service 320 accessing the formatting service 340, or the particular validation service 325. The formatting service 340 then returns to the loading service 310 filtered, structured features that are then passed to the analytic service 305.

An API service can be used to track authorization. For example, the analytic service 305 can include as a query parameter a variable that determines authorization. For example, as shown in Table 2, a FeatureRecord can comprise an "SEC" field that provides a security label. An overlying authentication system can pass down authenticated user information. The system can ensure that data is only exposed to authorized users by ensuring that the API service requesting the data matches the SEC field.

3. Example Algorithm for Extracting and Displaying a Feature Data Set

Figure 4:
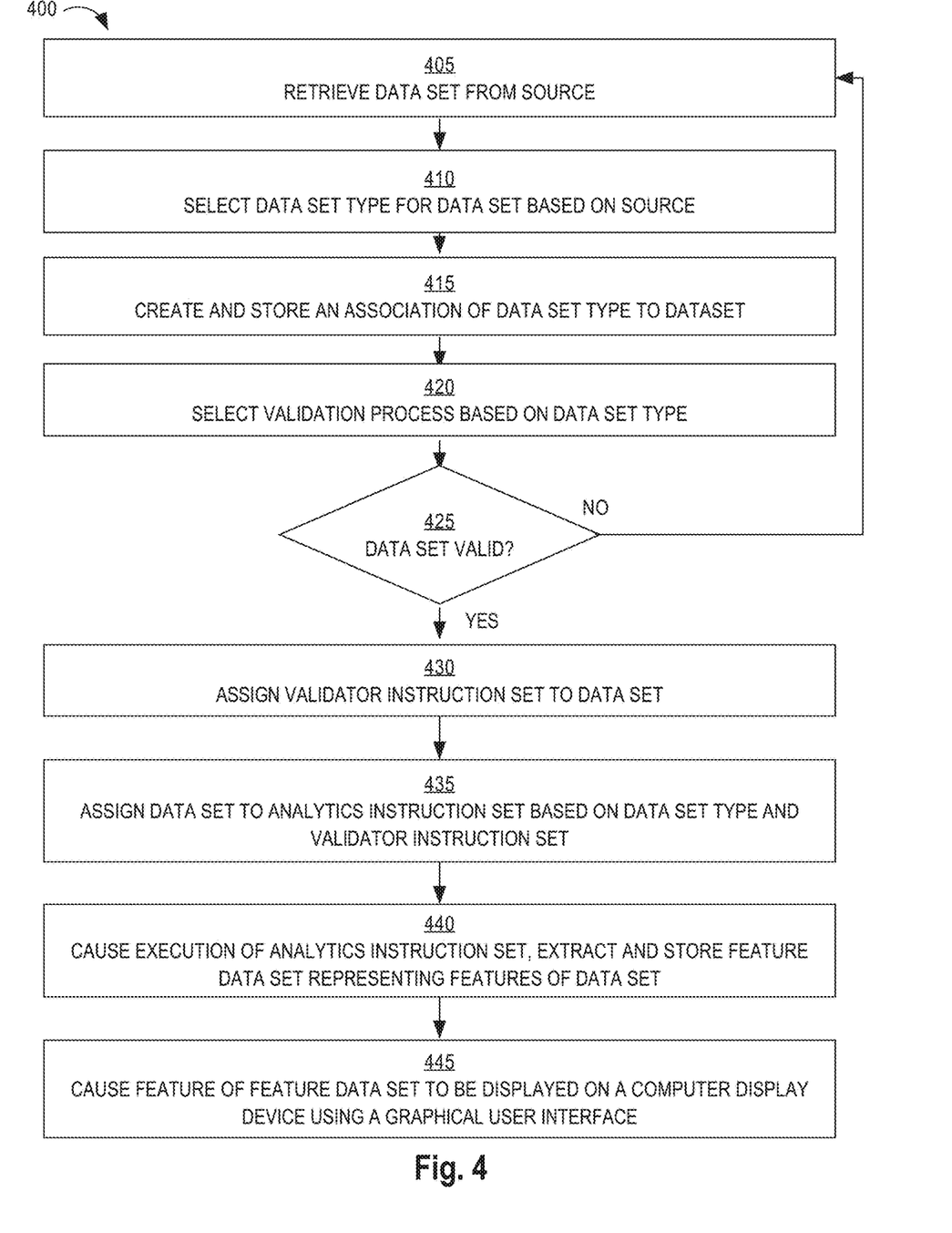
FIG. 4 illustrates an example process of extracting and displaying a feature data set, according to an embodiment.

FIG. 4 illustrates an example process of extracting and displaying a feature data set. FIG. 4, and each other flow diagram illustrating a process 400 or other processes, illustrates an example algorithm or specification that may be used as a guide for programming one or more computer programs, methods, objects or other software elements to implement the functions that are described. FIG. 4 is expressed at the same level of detail that persons of skill in the art customarily use to communicate among themselves about other algorithms, functions or programming instructions. The original claims set forth at the end of this disclosure may also serve as such algorithms, specifications or plans for computer programs at the same level of detail that is customarily used and understood by persons of skill in the art.

At step 402, the process 400 involves retrieving a digitally stored data set from a digital data storage source. The digital data storage source may in some cases be unfamiliar. For example, a security analytics system may retrieve security data from a source that the security analytics system is not coordinated with or has not been programmed to process. Retrieving stored data can be performed in a periodic manner.

At step 404, the process 400 involves selecting a first data set type for the first data set. The data set type may be indicative of a type of the value of the data set entry. For example, the data set type may be integer, URL, etc. The first data set type may be selected based on the source of the data set. For example, all data sets retrieved from a particular source may have a common type.

At step 406, the process 400 involves creating and storing an association of the first data set type to the first data set. For example, the data set type may be included in a FeatureRecord for the data set, as illustrated in Table 2.

At step 408, the process 400 involves selecting a validation process for the data set. The validation process may be selected based on the data set type. For example, each data set type may have an associated validation process. The validation process may also be selected based on the source.

At step 410, the process 400 involves executing program instructions corresponding to the selected validation process to determine if the data set is valid. The determination may indicate, for example, that the selected data set type matches the data set. If the data set is determined to be valid, the process 400 continues to step 412.

At step 412, the process 400 involves assigning a validator instruction set to the first data set. The validator instruction set may indicate that the data set has been validated.

At step 414, the process 400 involves assigning at least a portion of the first data set to an analytics instruction set. An analytics instruction set can include an analytic service as described in FIGS. 2 and 3. Each analytics instruction set can have an associated set of sources and/or types of data sets that the analytics instruction set is capable of receiving. The analytics instruction set can provide a set of parameters that is used in assigning the data set to the analytics instruction set. The data set may be assigned to the analytics instruction set based on the source and/or type of the data set and/or the selected validation process for the data set.

At step 416, the process 400 involves causing execution of the assigned analytics instruction set to extract a feature data set representing at least one feature of the data set. A feature data set includes information contained in the data set but has a structured format that allows it to be stored and accessed along with data from different sources.

At step 418, the process 400 involves, in response to a query, causing a feature represented in the feature data set to be displayed on a computer display device using a graphical user interface (GUI).

Embodiments may be utilized in various applications. For example, extracted data sets may be utilized in consumer applications, including computer security applications, to provide insights from gathered data. In a computer security application, extracted data sets may include discovered URLs, number of tested URLs, number and type of attack attempts, number of users testing each web asset, vulnerabilities discovered and severity of each vulnerability found within each web asset, activity on the system, visual indicators and numerical values of changes detected within each web asset, and assigned risk scores for each web asset. These data sets may be visually provided to users via a user interface which includes options for filtering results for a specific period of time or for specific results, such as particular URLs, vulnerabilities, or number ranges.

The techniques described herein may be implemented in a system that maintains system-wide consistency, minimizes contentious issues, and eases-up the decision making process throughout the development of analytics and querying processing over the output. The disclosed system is accountable for the actions performed over the input data. It can provide a trace of actions performed over the lifecycle of data (e.g., relevant transformations applied, storage locations, etc.). Such a trace and its associated summaries enable performing post-facto analysis should the errors precipitate and aid in error isolation and resolution. The end-user can follow the chain of this trace all the way back to the source (i.e. raw data) at which point a determination could be made about the state of the proposed system as either to have resulted in a failure or that the wrong inputs have been used.

The system also offers transparency about the entire lifecycle of data production, consumption, and storage. The transparency is expressed in real-time metrics, and made visible through a variety of off-the-shelf interfaces such as web-browser clients. Providing transparency aids in isolating the loci of the bottlenecks, helps with data exploration and discovery, and precipitation of key insights.

As the data may be procured from a variety of sources, the system is data-agnostic while having rules that specify type in order to have effective analytic transformations. This aids in performing type-sensitive analytic transformations, ensures consistency, minimizes the need for ad-hoc intermediate processing, fosters data exploration, and enables the end-user to validate steps in the established analytics. Another benefit to specifying type is to fold this capability naturally within the proposed system and preclude the analytic developers from developing disjointed analytics and their related documentation.

Furthermore, the system enables analysts of output datasets to publish their findings through a set of lucid and consistent interfaces over the entirety of the proposed system. This has the benefit of allowing rapid convergence to a solution through an iterative and guided analytic development process, and provides tools and pipelines to analysts to publish their results to clients and researchers in a timely manner.

4. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
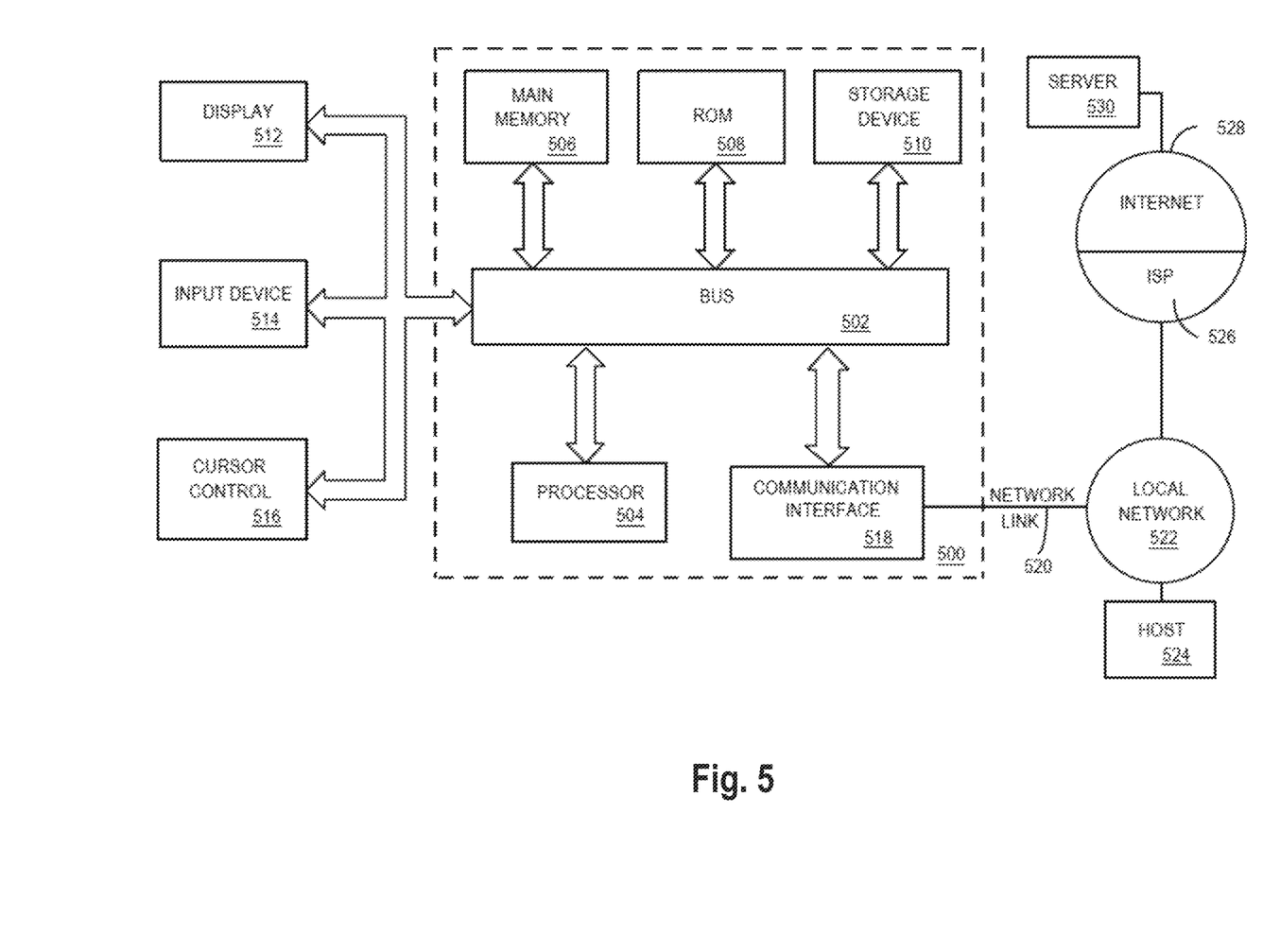
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    retrieving a digitally stored first data set from a first digital data storage source;
    selecting a first data set type of a plurality of data set types for the first data set based at least in part on the first digital data storage source, and creating and storing an association of the first data set type to the first data set;

selecting a first validation process from among a plurality of validation processes based at least in part on the first data set type;

executing program instructions corresponding to the first validation process using at least a portion of the first data set to determine if the first data set is valid;

in response to determining that the first data set is valid, assigning a validator instruction set to the first data set;

assigning at least a portion of the first data set to a first analytics instruction set of a plurality of analytics instruction sets based on the first data set type and the validator instruction set;

causing execution of the first analytics instruction set which performs a per-line parsing function on the first data set;

causing execution of the first analytics instruction set using at least a portion of the first data set to extract and store, in a transition component, a first feature data set representing features of the first data set;

determining, by the transition component, if further execution of the first analytics instruction set is needed to extract and store features of the first data set;

in response to determining that further execution of the first analytics instruction set is needed to extract and store features of the first data set, causing execution of the first analytics instruction set using at least a portion of the first feature data set to extract and store, in the transition component, a second feature data set representing features of the first data set;

in response to a query, causing a feature represented in the second feature data set to be displayed on a computer display device using a graphical user interface;

causing a trace of transformations applied on the first data set to be displayed on the computer display device using the graphical user interface.

2. The method of claim 1, wherein the first data set types comprise one or more of an integer, string, URL address, HTTP record, and TCP record and is indicative of the first digital data storage source.

3. The method of claim 1, further comprising receiving at least one of the plurality of data set types as input from a client computing device.

4. The method of claim 1, further comprising extracting at least one item of the following items associated with the first data set: format, data, identifier, source, destination, timestamp, listing, organization, and security information.

5. The method of claim 1, further comprising assigning the at least a portion of the first data set to the first analytics instruction set based on the first digital data storage source being included in a set of sources associated with the first analytics instruction set.

6. The method of claim 1, wherein the feature comprises a feature name, and wherein the query comprises at least the feature name.

7. The method of claim 1, further comprising causing execution of the program instructions which compare the first data set to the first data set type.

8. The method of claim 1, wherein the query comprises one or more parameters, the method further comprising filtering the first data set based on the one or more parameters to determine at least a portion of the first data set.

9. A security analytics system that is programmed for integrating security data sets from unfamiliar sources, the system comprising:

one or more processors;

one or more non-transitory digital computer readable storage media coupled to the one or more processors and storing sequences of instructions which, when executed, cause the one or more processors to:

retrieve a digitally stored first computer security data set from a first digital data storage source;

select a first computer security data set type of a plurality of computer security data set types for the first computer security data set based at least in part on the first digital data storage source, and creating and storing an association of the first computer security data set type to the first computer security data set;

select a first validation process from among a plurality of validation processes based at least in part on the first computer security data set type;

execute program instructions corresponding to the first validation process using at least a portion of the first computer security data set to determine if the first computer security data set is valid;

in response to determining that the first computer security data set is valid, assign a validator instruction set to the first computer security data set;

assign at least a portion of the first computer security data set to a first computer security analytics instruction set of a plurality of computer security analytics instruction sets based on the first computer security data set type and the validator instruction set;

cause execution of the first computer security analytics instruction set which performs a per-line parsing function on the first computer security data set;

cause execution of the first computer security analytics instruction set using at least a portion of the first computer security data set to extract and store, in a transition component, a first feature data set representing features of the first computer security data set;

in response to determining that further execution of the first computer security analytics instruction set is needed to extract and store features of the first computer security data set, cause execution of the first computer security analytics instruction set using at least a portion of the first feature data set to extract and store, in the transition component, a second feature data set representing features of the first computer security data set;

in response to a query, cause a feature represented in the second feature data set to be displayed on a computer display device using a graphical user interface;

cause a trace of transformations applied on the first computer security data set to be displayed on the computer display device using the graphical user interface.

10. The method of claim 1, further comprising causing a trace of storage locations used to be displayed on the computer display device using the graphical user interface.

* * * * *